Jan. 8, 1929.  
J. H. HAMMOND, JR  
1,698,092  
AUTOMATIC INDICATING MEANS FOR ODOMETERS  
Original Filed March 19, 1921  2 Sheets-Sheet 1
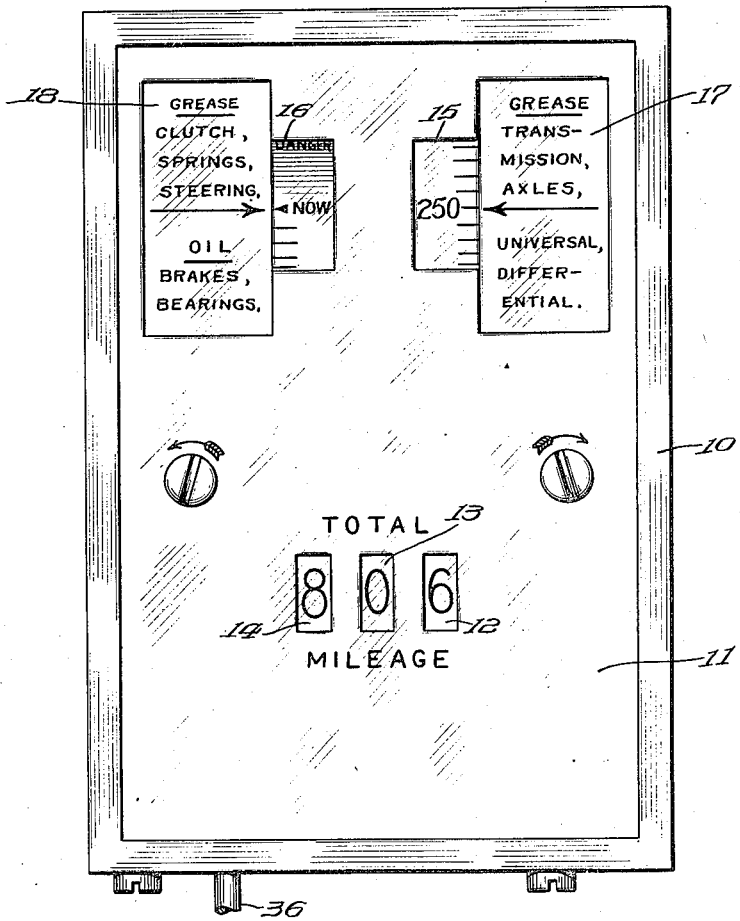

Jan. 8, 1929.  
J. H. HAMMOND, JR  
1,698,092  
AUTOMATIC INDICATING MEANS FOR ODOMETERS  
Original Filed March 19, 1921  2 Sheets-Sheet 2
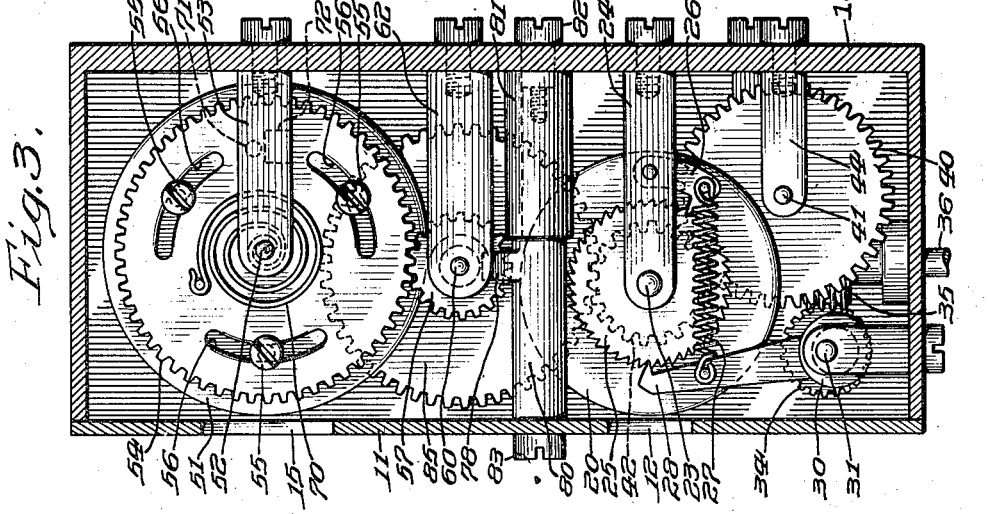
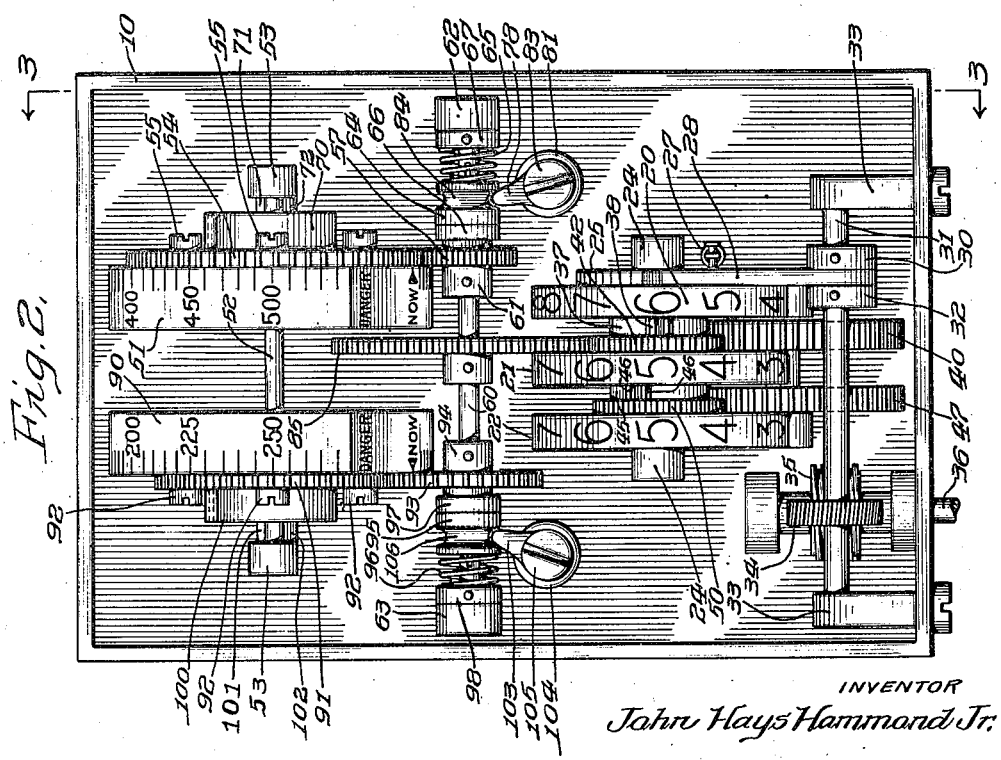
INVENTOR
John Hays Hammond Jr.
BY
A. J. Gardner
ATTORNEY
WITNESS
F. J. Hartman.

Patented Jan. 8, 1929.

1,698,092

UNITED STATES PATENT OFFICE.

JOHN HAYS HAMMOND, JR., OF GLOUCESTER, MASSACHUSETTS.

AUTOMATIC INDICATING MEANS FOR ODOMETERS.

Application filed March 19, 1921, Serial No. 453,636. Renewed June 5, 1928.

Some of the objects of the present invention are to provide means for automatically indicating when an automobile has covered a certain predetermined distance or distances; to provide means for indicating when certain parts of an automobile require attention; to provide means, operative after an automobile has run a predetermined number of miles, for indicating what parts require oil or other attention; and to provide other improvements as will hereinafter appear.

In the accompanying drawings, Fig. 1 represents a front elevation of an indicating instrument embodying the present invention; Fig. 2 represents a front elevation of the instrument with the cover removed showing the mechanism embodying one form of the present invention; and Fig. 3 represents a side elevation in the direction indicated by the arrows in Fig. 2.

Referring to the drawings, one form of the present invention comprises an instrument case 10 having a front cover plate 11 provided with openings 12, 13 and 14 through which numbers representing mileage are visible. The plate 11 is also provided with openings 15 and 16 through which mileage data is respectively visible, one of such openings, say 15, being juxtaposed to a plate 17, and the other opening 16 being juxtaposed with respect to a plate 18. The plates 17 and 18 are respectively provided with data as will be hereinafter explained. Beneath the plate 11 and juxtaposed respectively to the openings 12, 13 and 14 are three dial wheels 20, 21 and 22 having consecutive numbers respectively arranged upon their peripheries, one wheel, say 20, being a unit dial wheel, another, 21, being a tens dial wheel, and the third, 22, being a hundreds dial wheel. The unit dial wheel 20 is arranged to make one of its numbers visible through the opening 12; the tens dial wheel is arranged to make one of its numbers visible through the opening 13; and the hundreds dial wheel is arranged to make one of its numbers visible through the opening 14. All of the aforesaid dial wheels are loosely mounted upon a common fixed spindle 23 supported in brackets 24, and the respective positions of the dial wheels determine which number of each dial series of numbers is visible. The numbers of each dial, as here shown, run from zero to nine, and normally all are set so that zero on each is visible through the openings 12, 13 and 14.

In order to turn the unit dial 20, it is rigidly secured to a ratchet wheel 25 which is freely rotatable on the spindle 23 and is normally held fixed by a pivoted pawl 26 under the action of a spring 27, which in the present instance, also retains an operating pawl 28 in engagement with the ratchet 25. As here shown the pawl 28 is carried by an eccentric 30 pinned or otherwise made fast to a shaft 31, while an eccentric collar 32 serves to prevent the pawl 28 from slipping off the eccentric 30. The shaft 31 is suitably journalled in bearing supports 33 and motion is transmitted thereto by means of a worm wheel 34 fast to the shaft 31 and in mesh with a worm 35 which is rigidly secured to a shaft 36 projecting from the instrument case 10 where it connects with any suitable flexible shaft (not shown) arranged to be driven from the wheels or transmission of an automobile in any well known manner and similar to that used in standard speedometers.

In order to turn the tens dial wheel 21 at the definite required intervals, the unit dial wheel 20 is rigidly secured to a gear segment 37 having two teeth 38 arranged to mesh at each revolution with a gear 40 loosely mounted on a fixed shaft 41 and in mesh with a gear 42 loose upon the spindle 23 and fast to the tens dial wheel 21. The shaft 41 is suitably supported in brackets 43. Thus, at each revolution of the gear segment 37, the teeth 38 mesh with the gear 40 and cause it to turn the gear 42 through that portion of a revolution necessary to advance the dial wheel 21 from one index number to the next.

For causing the hundreds dial wheel 22 to be turned at the definite required intervals, a similar mechanism is provided, including a gear segment 45 rigidly secured to the dial wheel 21 and having two teeth 46 arranged to mesh at each revolution, with a gear 47 loosely mounted upon the shaft 41. This gear 47 is in constant mesh with a gear 50 fixed to the hundreds dial wheel 22 and loose upon the spindle 23. The foregoing is one form of standard mechanism used in odometers and need not be more fully described here.

In order to display mileage data through the opening 15, there is provided a dial wheel 51 having a series of graduations on its periphery numbered as indicated from zero to "500", the zero mark being located adjacent the word "Now" or any other suitable indicia, and half way between "Now" and "500" is a red line marked "Danger." The portion of the dial periphery between the words "Now" and "Danger" is colored red, the color shading deeper as it approaches the danger mark. This dial wheel 51 is loosely mounted on a rigid shaft 52 which is supported in suitable brackets 53 and carries loosely thereon a gear 54 to which the dial wheel 51 is rigidly made fast in a detachable manner by screws 55 passing respectively through a plurality of slots 56.

For causing the gear 54 to be intermittently turned through a part of a revolution, it is arranged in mesh with a pinion 57 loosely mounted on a rotatable shaft 60 and held against sliding movement by a collar 61. The shaft 60 is mounted in suitable bearings 62 and 63. Normally motion is transmitted to the pinion 57 from the shaft 60 by a movable clutch part 64, keyed to the shaft 60 for sliding movement thereon and held by a spring 65 in engagement with a complemental fixed clutch part 66 which is fast to the pinion 57. A collar 67 is pinned or otherwise made fast to the shaft 60 to take up the end thrust of the spring 65.

For returning the dial wheel 51 to its initial position a spiral spring 70 is provided having one end secured to the gear 54 and its other end fastened to the rigid shaft 52. A pin 71 is secured to and projects laterally from the gear 54 to engage a lug 72 on one of the brackets 53. When the pin 71 abuts the lug 72 the dial wheel 51 is in its starting or zero position. The clutch part 64 is disengaged by providing a finger 78 which is fixed to a spindle 80 pivoted in a bracket 81 and held against displacement by a screw 82. This spindle 80 has a projecting slotted end 83 which may be engaged by a screw driver or other instrument to rotate the finger 78 in the desired manner. The finger 78 seats in a groove 84 in the movable clutch part 64, whereby the latter is unclutched upon rotation of the finger 78 in the required direction.

As a means for rotating the shaft 60, it has fixed thereto a main gear 85 arranged in mesh with the gear 42, and the gear ratio in the present instance is such that two revolutions of the gear 42 are required to make one revolution of the shaft 60. Also the ratio of the gear 54 and pinion 57 is such that three revolutions of the pinion 57 are required for one revolution of the gear 54. These ratios may be varied as desired to produce different results.

In order to display mileage data through the opening 16, a dial wheel 90 is provided having a series of graduations on its periphery numbered, as indicated, from zero to "250", the zero being located adjacent the word "Now", and half way between the mark "Now" and "250" is a red line marked "Danger". The portion of the dial periphery between the words "Now" and "Danger" is colored red, the color shading deeper as it approaches the danger mark. The dial wheel 90 is loosely mounted on the rigid shaft 52 and fixed to a gear 91 in a detachable manner by screws 92 passing respectively through a plurality of slots 92'. The gear 91 is rotatable on the shaft 52, being driven by a pinion 93 loose upon the shaft 60. The pinion 93 is held against sliding movement by a collar 94 and is arranged to be periodically rotated by a movable clutch part 95 keyed to the shaft 60 for sliding movement and held by a spring 96 in engagement with a complemental fixed clutch part 97 which is fast to the pinion 93. A collar 98 is fixed to the shaft 60 to take up the end thrust of the spring 96.

The dial wheel 90 is arranged to be returned to its initial position by a spiral spring 100, one end of which is fixed to the gear 91 and the other end to the shaft 52. A pin 101 is secured to and projects laterally from the gear 91 to engage a lug 102 on one of the brackets 53. When the pin 101 abuts the lug 102, the dial wheel 90 is in its initial or zero position. The clutch part 95 is disengaged by providing a finger 103 which is fixed to a spindle 104 pivoted in a manner as described for the spindle 78. This spindle 104 has a projecting slotted end 105 which may be engaged by a screw driver or other implement to actuate the finger 103 as desired. The finger 103 seats in a groove 106 in the movable clutch part 95, whereby the latter can be unclutched by movement of the finger 103 in the required direction.

In the present construction the ratio between the gear 91 and the pinion 93 is such that three revolutions of the pinion 93 are required to make two revolutions of the gear 91. This ratio may be varied according to requirements.

The plate 17 is engraved or otherwise marked with the names of those parts of the automobile which need attention after running a certain number of miles, and an arrow is also provided to point to successive dial graduations as the dial wheel 51 is turned. The plate 18 is also engraved or otherwise marked with the names of those parts of the automobile which require attention after running a less number of miles than the parts enumerated on the plate 17. An arrow is also provided to point to successive dial graduations as the dial wheel 90 is turned.

In the operation of this form of the invention the shaft 36 is rotated by the motion of the front wheel of the automobile, or by the transmission thereof, thus rotating the worm 35 to drive the worm wheel 34 and thereby rotate the shaft 31. This causes the eccentric 30 to actuate the pawl 28 at each revolution so that the ratchet 25 moves one tooth for each revolution of the shaft 31. This causes the unit dial 20 to be rotated, in a counter-clockwise direction as seen in Fig. 3, thus bringing the numbers consecutively into register with the opening 12. The gear ratios are so proportioned that when the automobile has travelled one mile the dial 20 will be moved from one dial number to the next. This action continues until the teeth 38 engage the teeth of the gear 40 when the latter is turned through a fraction of a revolution and transmits motion to the gear 42, the movement being arranged to cause the tens dial 21 to turn through that portion of a revolution as will bring the next succeeding number into position, that is, into register with the opening 13. The same general operation takes place for the movement of the hundreds dial, an action which is common to all standard odometer mechanisms.

From the foregoing it is evident that the gear 42 will make one complete revolution for every hundred miles travelled by the automobile, and in consequence the gear 85, in mesh therewith, will have made a half revolution. The shaft 60, therefore, is turned through one complete revolution every two hundred miles and the pinions 57 and 93, which are driven respectively by the clutches 64 and 95 rotate with the same speed as the shaft 60 as long as the clutches are engaged. In the present instance the gear ratio between the gears 57 and 54 is 1 to 3 so that six hundred miles of travel are required to cause one complete revolution of the dial 51, while the gear ratio between the gears 93 and 91 is 2 to 3 so that a travel of three hundred miles causes a complete revolution of the dial 90. In Fig. 2 it is supposed that the greasing and oiling of the machine (as indicated on the plates 17 and 18) have been attended to and that the dials 51 and 90 have been set to their initial positions. This is done by rotating the members 83 and 104 to release the clutches 64 and 95 whereby the dials 51 and 90 automatically turn back under the action of the springs 70 and 100 until the respective pins 71 and 101 engage the stops 72 and 102.

When the machine starts, assuming the mileage indicated is 556 miles as indicated in Fig. 2, and runs 250 miles, the total mileage will be indicated as 806 miles as in Fig. 1 while the dials 51 and 90 will have moved to the position indicated in Fig 1, the mark "Now" on the dial 90 being opposite the arrow on the plate 18 and the number 250 on the dial 51 being opposite the arrow on the plate 17. This indicates it is now time to grease the clutch, springs and steering mechanism and to oil the brakes and bearings. If this is done the member 105 should be rotated to release the clutch 95 to allow the spring 100 to return the dial 90 to its initial position. If the greasing and oiling is not attended to, the dial 90 will continue to move, thus bringing the red portion opposite the arrow and the word Danger in the opening 16, thus notifying the operator that he has passed the point where greasing and oiling should be attended to.

The same action occurs with respect to the dial 51, except that it takes 500 miles, instead of 250 miles, to bring the word Now opposite the arrow on the plate 17. The numbers on the dials 51 and 90 are provided so that the operator can tell how many more miles can be gone before having to grease or oil the car as indicated. By means of the screws 55 and 92 the initial positions of the dials 51 and 90 can be made anything desired, this depending upon the make of car upon which the instrument is mounted.

Having thus described my invention, I claim:

1. In an indicating instrument, a casing provided with a sight opening and having designations on the outward side thereof and adjacent said opening, and means movable with respect to said casing actuated in accordance with the extent of movement of a moving device and having thereon characters displayed through said opening to indicate the extent of movement of said moving device since the parts corresponding to the designations adjacent the respective opening have been lubricated and having thereon indicia subsequently displayed through said opening to warn of danger in continued movement of said parts.

2. An indicating instrument for motor vehicles comprising a dial arranged to initially indicate a predetermined maximum mileage, having thereon suitable characters forming a warning signal, means operated by the travel of the vehicle for actuating said dial whereby the dial will indicate successively decreasing mileage and ultimately display said characters, a relatively fixed indicating symbol for indicating the character to be read.

3. In an indicating device for automobiles, the combination of a stationary indicating means for designating certain parts of a vehicle, and movable means operated in accordance with the movement of the vehicle for indicating when the parts designated on said stationary means should be lubricated, the movable means being arranged to display said indication during a probationary interval and to display warning characters upon subsequent movement of the vehicle.

4. In an indicating instrument, a fixed member and a relatively movable member, and means for moving said movable member in proportion to the distance traversed by a vehicle, said movable member having a group of mileage indicia thereon and a separate group of warning indicia thereon, said fixed member having an index arranged to indicate which of said indicia is to be read, and registering with either of said groups of indicia.

5. In an indicating instrument, a casing provided with a sight opening and having designations on the outward side thereof and adjacent said opening, and means movable with respect to said casing and actuated in accordance with the extent of movement of the moving device and having thereon a plurality of groups of characters displayed through said opening, one of said groups of characters being arranged to give assurance of safety to said moving device and a different group of characters being arranged to give warning of danger to said moving device, said casing designations being arranged to register with the groups of characters upon said movable means successively.

Signed at New York, in the county of New York and State of New York, this 16th day of March, 1921.

JOHN HAYS HAMMOND, Jr.